United States Patent

McKaughan et al.

[11] Patent Number: 6,014,744
[45] Date of Patent: Jan. 11, 2000

[54] STATE GOVERNING THE PERFORMANCE OF OPTIONAL BOOTING OPERATIONS

[75] Inventors: Robert M. McKaughan, Bellevue; Forrest Foltz, Woodinville, both of Wash.

[73] Assignee: Microsoft Corporation, Redmond, Wash.

[21] Appl. No.: 09/006,234

[22] Filed: Jan. 13, 1998

[51] Int. Cl.[7] .................................................. G06F 9/445
[52] U.S. Cl. ................................ 713/2; 713/100; 714/36
[58] Field of Search .............................. 395/652, 183.22, 395/700, 650, 800, 308; 380/4; 713/1, 2, 100; 711/141; 714/4, 15, 10, 26, 36; 709/220

[56] References Cited

U.S. PATENT DOCUMENTS

| | | | |
|---|---|---|---|
| 5,142,680 | 8/1992 | Ottman et al. | 395/700 |
| 5,214,695 | 5/1993 | Arnold et al. | 380/4 |
| 5,247,659 | 9/1993 | Curran et al. | 713/1 |
| 5,355,489 | 10/1994 | Bealkoeski et al. | 395/700 |
| 5,463,766 | 10/1995 | Schive et al. | 395/650 |
| 5,564,108 | 10/1996 | Hunsaker et al. | 395/800 |
| 5,574,915 | 11/1996 | Lemon et al. | 395/700 |
| 5,640,504 | 6/1997 | Johnson, Jr. | 714/4 |
| 5,724,527 | 3/1998 | Karnik et al. | 395/308 |
| 5,809,531 | 9/1998 | Brabandt | 711/141 |

OTHER PUBLICATIONS

Scott Townsend, *Bios Boot Specification, Version 1.00,* Phoenix Technologies Ltd, Irvine, CA, Oct. 11, 1995, pp. 1–42.

Compaq Computer Corporation, Intel Corporation, and Phoenix Technologies. Ltd., *Extended System Configuration Data Specification, Version 1.02A,* Phoenix Technologies, Ltd., Irvine, CA, May 31, 1994, pp. 1–34.

*Primary Examiner*—Joseph E. Palys
*Assistant Examiner*—Ri Jue Mai
*Attorney, Agent, or Firm*—Leydig, Voit & Mayer, Ltd.

[57] ABSTRACT

The present invention is directed to a facility for performing selected operations as part of a booting process of a computer system only during iterations of the booting process that immediately follow failed iterations of the booting process. At the beginning of the booting process, the facility copies a persistent instance of a flag indicating whether the iteration of the booting process at the current iteration of the booting process immediately follows fail to a temporary instance of the flag. The facility then assigns the persistent instance of the flag to the set condition so that, if the current iteration of the booting process fails before completing, the flag will reflect that the current iteration of the booting process failed. When each selected operation is encountered during the current iteration of the booting process, the facility performs that selected operation only if the temporary instance of the flag is set. If and when the current iteration of the booting process concludes successfully, the facility clears the persistent instance of the flag to reflect that the current iteration of the booting process completed successfully. In a further preferred embodiment, programs, such as the BIOS or the operating system, may set a second flag to explicitly request the performance of the selected operations during the next iteration of the booting process.

16 Claims, 5 Drawing Sheets

STATE GOVERNING THE PERFORMANCE OF OPTIONAL BOOTING OPERATIONS

TECHNICAL FIELD

The present invention is directed to the field of computer software optimization, and more particularly, to optimizing the process of booting an operating system.

BACKGROUND OF THE INVENTION

The term "booting" refers to a process of loading and executing programs, principally those comprising a basic input/output system ("BIOS") and an operating system, in order to prepare a computer system for use by a user. The booting process is said to be made up of a number of operations generally performed by either the BIOS or the operating system. These operations include diagnostic operations, which attempt to diagnose problems with the computer system, installed devices, or the software configuration of the computer system. As BIOSes and operating systems continue to evolve and the number of devices commonly installed in computer systems increases, the number and duration of operations invoked during the booting process increases. At the same time, consumers continue to demand that computers become usable a shorter period of time after they are switched on, which in turn requires an overall reduction of the time requirements of the booting process.

Based on the foregoing, an automated facility that expedited the booting process by omitting certain operations during iterations of the booting process in which the performance of these operations is unnecessary would have significant utility.

SUMMARY OF THE INVENTION

The present invention provides a software facility for expediting the booting process ("the facility"). The facility maintains a state that it uses to govern the performance of certain booting operations in the BIOS and/or the operating system, such as diagnostic operations, that are conventionally performed during every iteration of the booting process. During an iteration of the booting process, based on the maintained state, the facility determines whether these "optional" booting operations need to be performed during the present iteration of the booting process. If the facility determines that the optional booting operations do not need to be performed during the present iteration, they are omitted from this iteration of the booting process, thereby reducing the amount of time consumed by this iteration of the booting process and allowing the user to use the computer system a shorter period of time after switching the computer system on. The facility further permits the operating system and BIOS to detect failures of the booting process.

In a preferred embodiment, the state maintained by the facility comprises a pair of flags that it stores persistently: a BOOTING flag that indicates whether the last iteration of the booting process was completed successfully, and a DIAGNOSTICS flag that indicates whether diagnostic operations should be performed without regard for the condition of the BOOTING flag. During each iteration of the booting process, if (1) the BOOTING flag indicates that the last boot was not completed successfully or (2) the DIAGNOSTICS flag indicates that diagnostic operations should be performed without regard for the condition of the BOOTING flag, the facility performs diagnostic operations in the BIOS and operating system portions of the booting process. On the other hand, if (1) the BOOTING flag indicates that the last iteration of the booting process was completely successful and (2) the DIAGNOSTICS flag does not indicate that diagnostics should be performed without regard for the condition of the BOOTING flag, the facility omits diagnostic operations from the BIOS and/or operating system portions of the booting process.

The facility preferably also allows the BIOS or the operating system to explicitly set the DIAGNOSTICS flag to indicate that diagnostic operations should be performed without regard for the condition of the BOOTING flag. The BIOS or the operating system may cause the facility to set the DIAGNOSTICS flag, for example, when new hardware or software is installed, after a predetermined number of successful iterations of the booting process, or at the end of a predetermined time period. The DIAGNOSTICS flag is preferably also set when a new version of the BIOS or the operating system is installed.

DETAILED DESCRIPTION OF THE INVENTION

The present invention provides a software facility for expediting the booting process ("the facility"). The facility maintains a state that it uses to govern the performance of certain booting operations, such as diagnostic operations, that are conventionally performed during every iteration of the booting process. During an iteration of the booting process, based on the maintained state, the facility determines whether these "optional" booting operations need to be performed during the present iteration of the booting process. If the facility determines that the optional booting operations do not need to be performed during the present iteration, they are omitted from this iteration of the booting process, thereby reducing the amount of time consumed by this iteration of the booting process and allowing the user to use the computer system a shorter period of time after switching the computer system on.

In a preferred embodiment, the state maintained by the facility comprises a pair of flags that it stores persistently: a BOOTING flag that indicates whether the last iteration of the booting process was completed successfully, and a DIAGNOSTICS flag that indicates whether diagnostic operations should be performed without regard for the condition of the BOOTING flag. During each iteration of the booting process, if (1) the BOOTING flag indicates that the last boot was not completed successfully or (2) the DIAGNOSTICS flag indicates that diagnostic operations should be performed without regard for the condition of the BOOTING flag, the facility performs diagnostic operations in the BIOS and operating system portions of the booting process. On the other hand, if (1) the BOOTING flag indicates that the last iteration of the booting process was completely successful and (2) the DIAGNOSTICS flag does not indicate that diagnostics should be performed without regard for the condition of the BOOTING flag, the facility omits diagnostic operations from the BIOS and/or operating system portions of the booting process.

The facility preferably also allows the BIOS or the operating system to explicitly set the DIAGNOSTICS flag to indicate that diagnostic operations should be performed without regard for the condition of the BOOTING flag. The BIOS or the operating system may cause the facility to set the DIAGNOSTICS flag, for example, when new hardware or software is installed, after a predetermined number of successful iterations of the booting process, or at the end of a predetermined time period. The DIAGNOSTICS flag is preferably also set when a new version of the BIOS or the operating system is installed.

Figure 1:
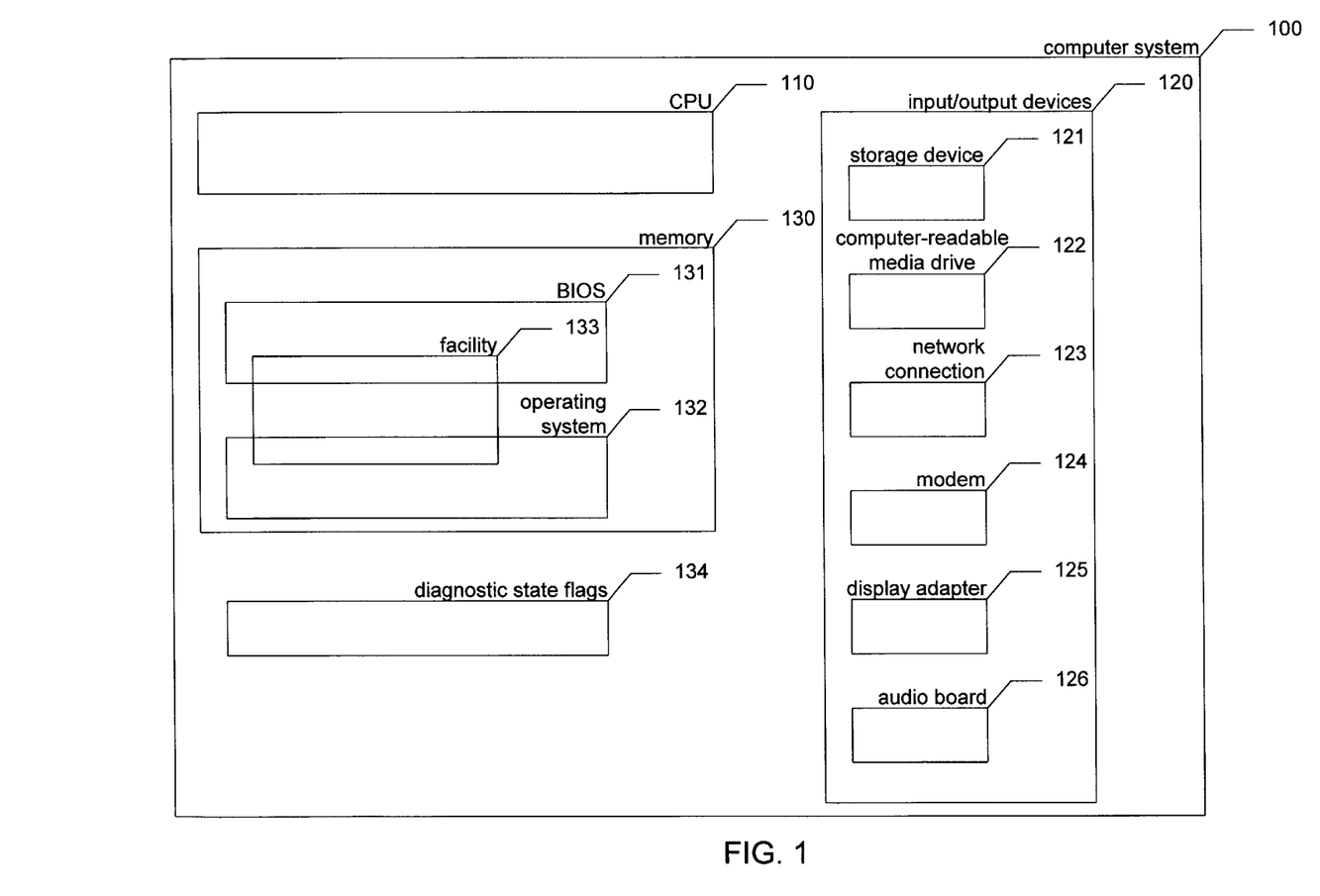
FIG. 1 is a high-level block diagram of the general-purpose computer system upon which the facility preferably executes.

FIG. 1 is a high-level block diagram of the general-purpose computer system upon which the facility preferably executes. The computer system 100 contains a central processing unit (CPU) 110, input/output devices 120, a computer memory (memory) 130, and a persistent memory 140. Among the input/output devices is a storage device 121, such as a hard disk drive; a computer-readable media drive 122, which can be used to install software products, including the facility, which are provided on a computer-readable medium, such as a CD-ROM; a network connection 123, through which the computer system 100 may communicate with other connected computer systems (not shown); a modem 124; a display adapter 125; and an audio board 126. The memory 130 preferably contains a BIOS 131; an operating system 132; and the facility 133, which is incorporated into the BIOS and the operating system. The BIOS 131 may preferably include a system BIOS, as well as additional BIOSes stored in option ROMs. The persistent memory 140 preferably contains diagnostic state flags 141 including the BOOTING flag and the DIAGNOSTICS flag. The persistent memory 140 is preferably a nonvolatile storage device, such as flash memory, complementary metal-oxide semiconductor random access memory ("CMOS RAM"), or other battery-backed random access memory, for storing the diagnostic state flags 134 persistently while the computer system 100 is switched off or otherwise without power. In certain embodiments, the nonvolatile storage device is integrated into a real-time clock device. The diagnostic state flags may also be persistently stored on the storage device 121. Wile the facility is preferably implemented on a computer system configured as described above, those skilled in the art will recognize that it may also be implemented on computer systems having different configurations.

Figure 2:
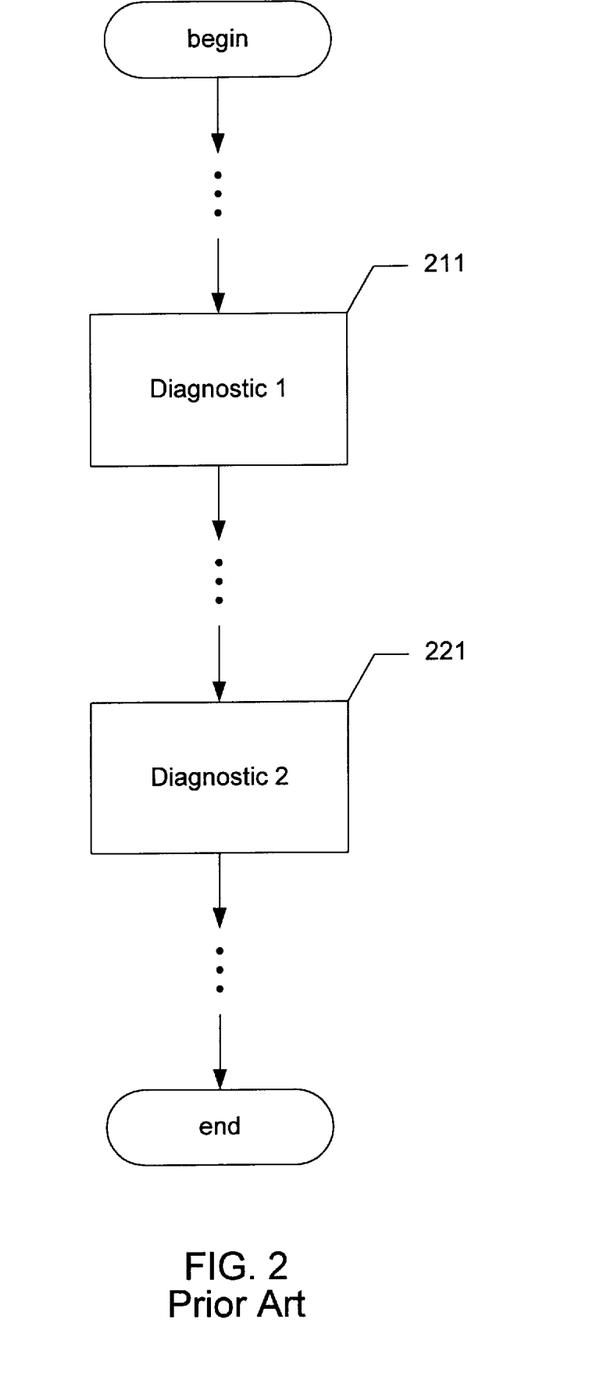
FIG. 2 is a flow diagram showing the steps preferably performed in the BIOS and the operating system as part of a conventional booting process.

In order to more effectively describe the facility, its operation is discussed herein with respect to a simple example. FIG. 2 is a flow diagram showing the steps preferably performed in the BIOS and the operating system as part of a conventional booting process. FIG. 2 shows that, at one point during the booting process in step 211, a first diagnostic operation is performed by the BIOS or the operating system. It can further be seen that either the BIOS or the operating system later performs a second diagnostic operation in step 221. It can further be seen that steps 211 and 221 for performing the diagnostic operations are generally performed in each iteration of the booting process. When these diagnostic operations are performed during each iteration of the booting process, the amount of time required to perform these diagnostic operations is added to the total amount of time required to complete every iteration of the booting process.

Figure 3:
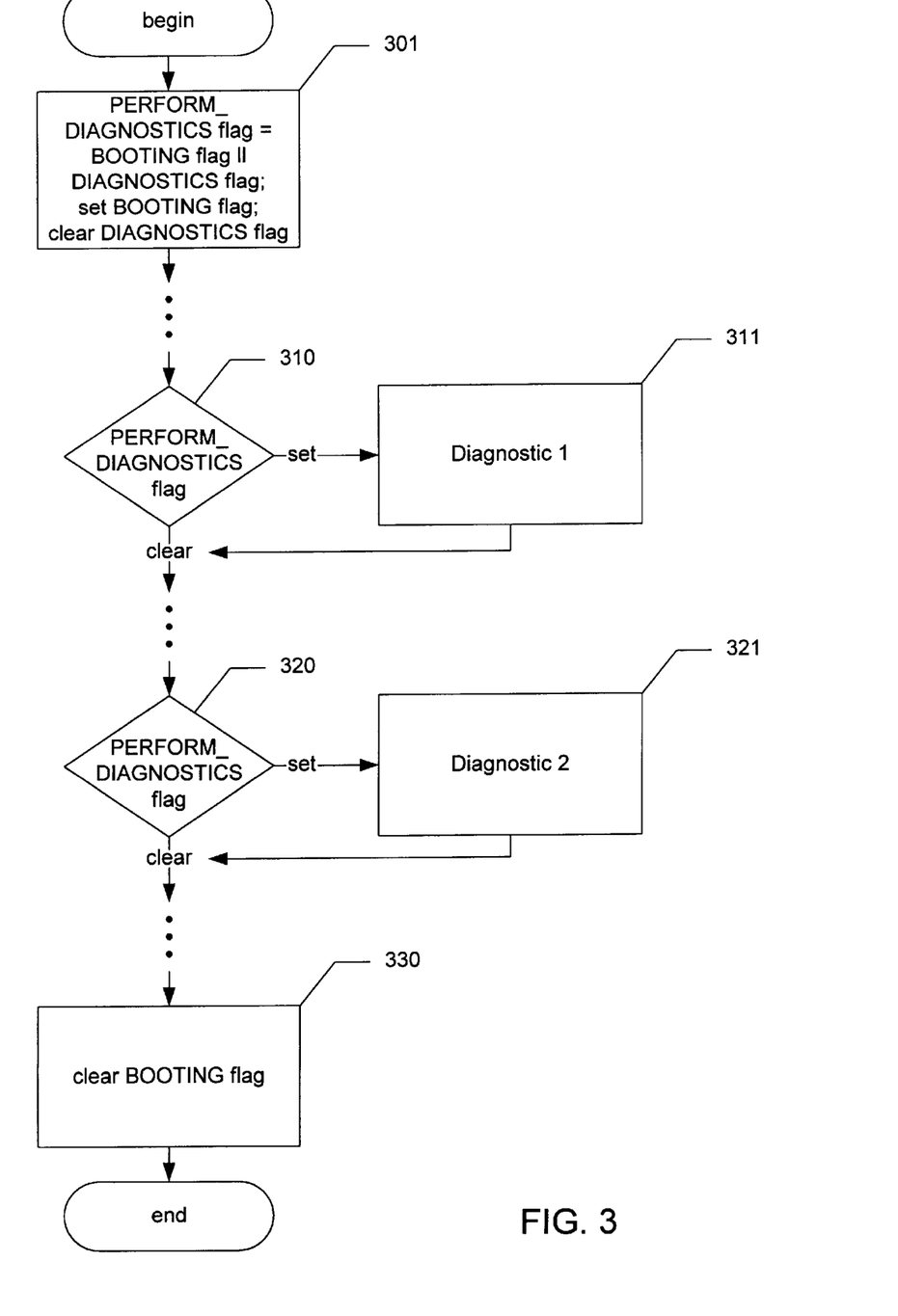
FIG. 3 is a flow diagram showing a booting process that performs the same two diagnostic operations and implements the facility.

FIG. 3 is a flow diagram showing a booting process that performs the same two diagnostic operations and implements the facility. In step 301, the facility sets the condition of a PERFORM_DIAGNOSTICS flag that determines whether conditional diagnostics will be performed by the BIOS and the operating system. If either the BOOTING flag or the DIAGNOSTICS flag is set, then the facility sets the PERFORM_DIAGNOSTICS flag. On the other hand, if neither the BOOTING flag nor the DIAGNOSTICS flag is set, then the facility clears the PERFORM_DIAGNOSTICS flag. Where the BOOTING flag is set, in certain embodiments, the facility further takes corrective action (not shown), such as automatically identifying and remediating a condition causing the failure in the booting process, or sending a failure report to a product support service for analysis. In step 301, the facility further sets the BOOTING flag and clears the DIAGNOSTICS flag. Step 301 is preferably performed as early as possible in the booting process. To that end, steps 301–303 are preferably performed in the BIOS, whose portion of the booting process typically precedes that of the operating system, as early in the execution of the BIOS as possible. At a point in the booting process after step 301, it is time to perform the first diagnostic operation. In step 310, if the PERFORM_DIAGNOSTICS flag is set, then the facility continues in step 311 to perform the first diagnostic operation, else the PERFORM_DIAGNOSTICS flag is clear and the booting process bypasses the performance of the first diagnostic operation in step 311. Similarly, when it is time for the second diagnostic operation to be performed, in step 320, if the PERFORM_DIAGNOSTICS flag is set, then the facility continues in step 321 to perform the second diagnostic operation, else the PERFORM_DIAGNOSTICS flag is clear and the booting process continues without performing the second diagnostic operation in step 321. Where the PERFORM_DIAGNOSTICS flag is clear and the booting process bypasses the performance of the diagnostic operations, the amount of time required by the booting process is reduced by the amount of time that would have been required to perform the diagnostic operations. In a preferred embodiment of the invention, the performance of each diagnostic operation during the booting process is conditioned on the state of the PERFORM_DIAGNOSTICS flag as shown in steps 310 and 320. In a further preferred embodiment, certain essential diagnostic operations are not conditioned on the PERFORM_DIAGNOSTICS flag, so that they are performed in each iteration of the booting process. In step 330, after the booting process has completed successfully, the facility clears the BOOTING flag. Step 330 is preferably performed as close to the end of the booting process as possible, and thus is preferably performed in the operating system. After step 330, the booting process concludes.

Figure 4:
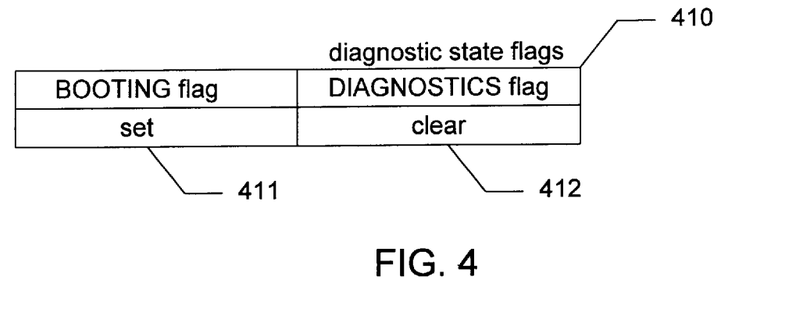
FIG. 4 is a state diagram showing the condition of the diagnostic state flags after an iteration of the booting process was not completed successfully.

FIG. 4 is a state diagram showing the condition of the diagnostic state flags after an iteration of the booting process was not completed successfully. In the flags 410, the BOOTING flag 411 is set, and the DIAGNOSTICS flag 412 is clear. This state indicates that, during the last iteration of the booting process, the BOOTING flag was set in step 301, but never cleared in step 330. This indicates that the last iteration of the booting process did not complete successfully, as execution never reached step 330. In the next iteration of the booting process when the flags are in the condition shown in FIG. 4, the facility sets the PERFORM_DIAGNOSTICS flag in step 301, causing the diagnostic operations to be performed in steps 311 and 321. If this iteration of the booting process completes successfully, then the BOOTING flag is cleared in step 330.

Figure 5:
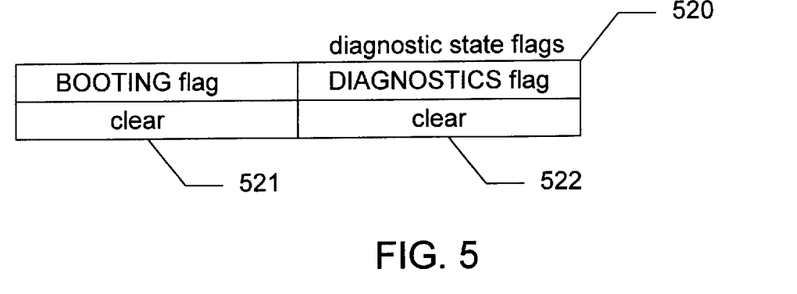
FIG. 5 is a state diagram showing the condition of the diagnostic state flags after an iteration of the booting process was completed successfully.

FIG. 5 is a state diagram showing the condition of the diagnostic state flags after an iteration of the booting process was completed successfully. FIG. 5 shows that, after the booting process completes successfully and step 330 is executed, the BOOTING flag 521 is cleared. As a result, unless the BIOS or the operating system causes the facility to set the DIAGNOSTICS flag, the facility will disable the diagnostic operations during the next iteration of the booting cycle.

Figure 6:
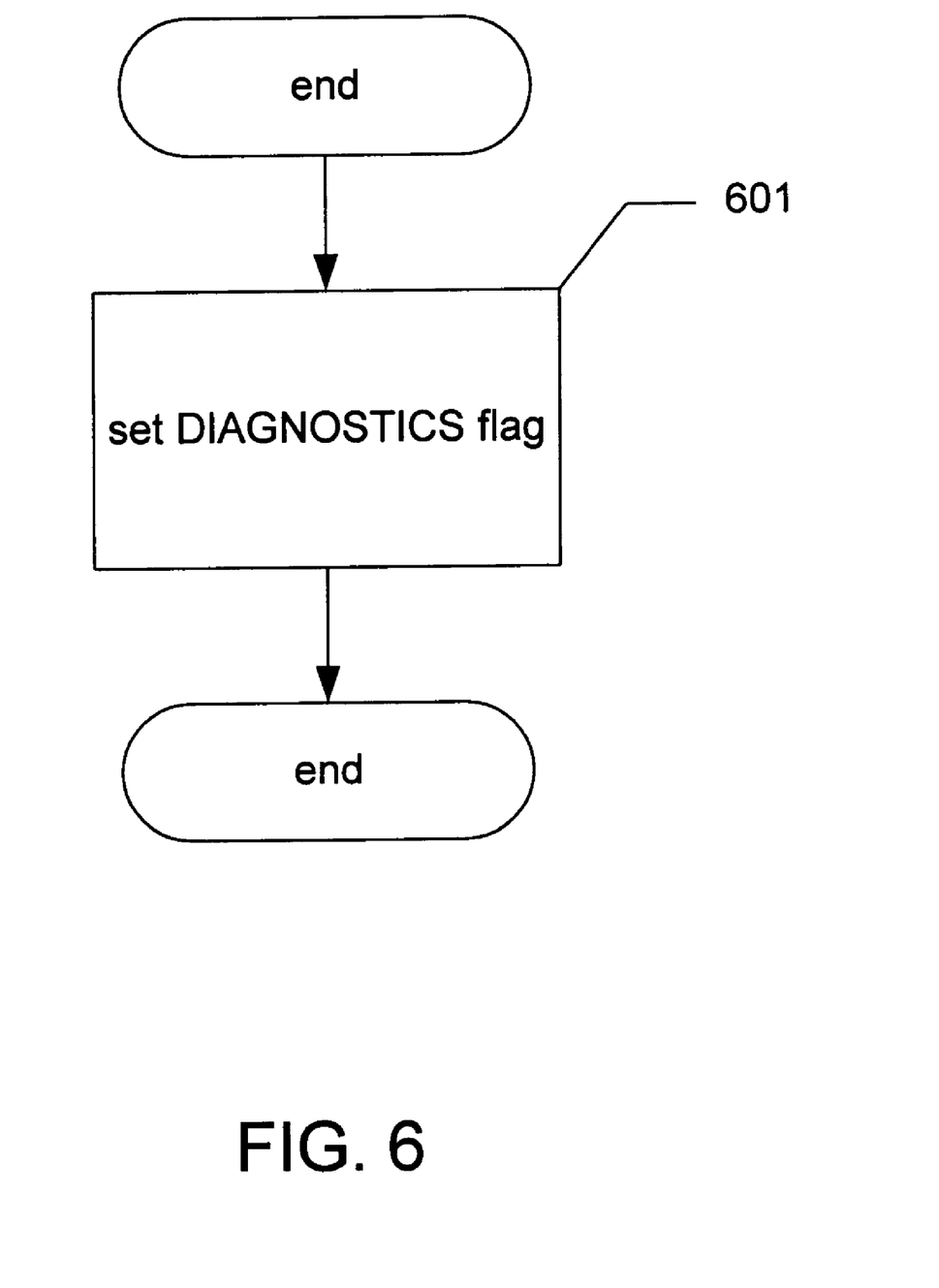
FIG. 6 is a flow diagram showing the steps preferably performed by the facility when the BIOS or the operating system specifies that diagnostic operations are to be performed during the next iteration of the booting process.

FIG. 6 is a flow diagram showing the steps preferably performed by the facility when the BIOS or the operating system specifies that diagnostic operations are to be performed during the next iteration of the booting process. The BIOS or the operating system invokes these steps of the facility to ensure that the diagnostic operations are performed during the next iteration of the booting process irrespective of the condition of the BOOTING flag. The BIOS or the operating system may do so, for example, when new hardware or software is installed after a predetermined number of successful iterations of the booting process, or at the end of a predetermined time period. The equivalent of these steps is preferably also performed to set the DIAGNOSTICS flag when a new version of the BIOS or the operating system is installed. In step 601, the facility sets the DIAGNOSTICS flag. After step 601, these steps preferably conclude and return to the BIOS or the operating system.

Figure 7:
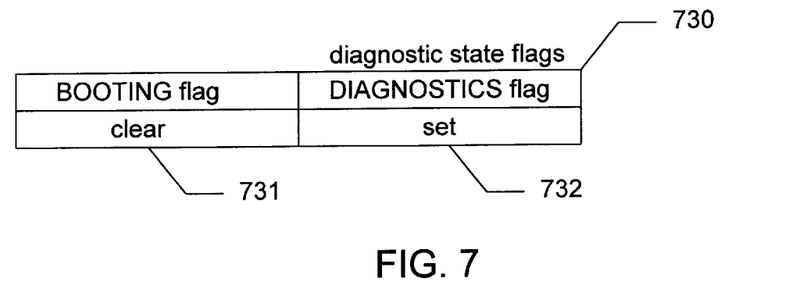
FIG. 7 is a state diagram showing the condition of the diagnostic state flags after the BIOS or the operating system has invoked the steps shown in FIG. 6 to set the DIAGNOSTICS flag.

FIG. 7 is a state diagram showing the condition of the diagnostic state flags after the BIOS or the operating system has invoked the steps shown in FIG. 6 to set the DIAGNOSTICS flag. It can be seen in FIG. 7 that the DIAGNOSTICS flag 732 is set. As a result, the facility will cause the diagnostic operations to be performed during the next iteration of the booting cycle, irrespective of the condition of the BOOTING flag.

Figure 8:
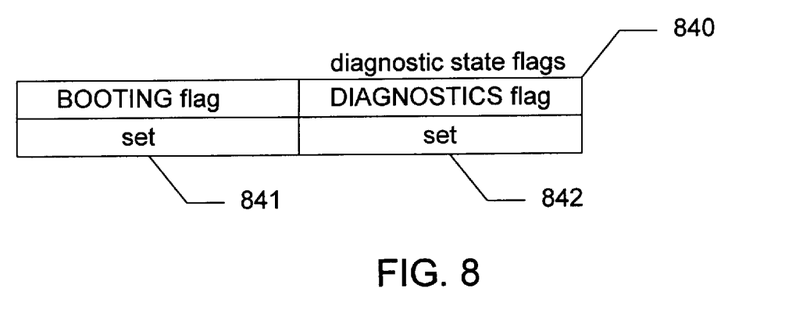
FIG. 8 is a state diagram showing the condition of the diagnostic state flags after the BIOS or the operating system sets the DIAGNOSTICS flag during an iteration of the booting process that does not complete successfully.

FIG. 8 is a state diagram showing the condition of the diagnostic state flags after the BIOS or the operating system sets the DIAGNOSTICS flag during an iteration of the booting process that does not complete successfully. It can be seen from FIG. 8 that the facility has set the DIAGNOSTICS flag 842 in step 601 in response to the BIOS or the operating system during the incomplete booting cycle. It can further be seen from FIG. 8 that the BOOTING flag 841 was set in step 301, and was not cleared in step 330 as the booting process did not complete successfully. Thus, during the next iteration of the booting process, the facility will perform the diagnostic operations.

While this invention has been shown and described with reference to preferred embodiments, it will be understood by those skilled in the art that various changes or modifications in form and detail may be made without departing from the scope of the invention. For example, the diagnostic state flags may be persistently stored using any of a large number of different persistent storage techniques. Further, programs other than the BIOS and the operating system, such as application or utility programs, may both (A) incorporate tests on the condition of the diagnostic state flags used to condition diagnostic operations or other optional operations, and (B) invoke the steps shown in FIG. 6 to set the DIAGNOSTICS flag in order to specify that diagnostic operations are to be performed during the next iteration of the booting process without regard for the condition of the BOOTING flag. Also, the BOOTING and DIAGNOSTICS flags may be merged into a single flag that is used both to detect failures during the boot process and to specify the diagnostic operations to be performed during the next iteration of the booting process.

We claim:

1. A method in a computer system for booting a computer system, the method comprising the steps of:

in conjunction with the beginning of the booting process:
reading from persistent storage a first flag and a second flag, the first flag having either a first state indicating that a previous iteration of the booting process terminated prematurely or a second state indicating that the previous iteration of the booting process did not terminate prematurely, the second flag having either a first state indicating that the performance of diagnostic operations has been expressly requested or a second state indicating that the performance of diagnostic operations has not been expressly requested;

generating a third flag having either a first state indicating that diagnostic operations should be performed during the booting process or a second state indicating that diagnostic operations should not be performed during the booting process based upon the states of the first and second flags as read from persistent storage, the third flag having the first state if either the first flag or the second flag both have the first state, the third flag having the second state if both the first flag and the second flag have the second state;

after the generating step:
updating in persistent storage the first flag to the first state;
updating in persistent storage the second flag to the second state;
for each of one or more diagnostic operations,
performing the diagnostic operation if and only if the third flag has the first state; and in conjunction with the end of the booting process:
updating in persistent storage the first flag to the second state.

2. The method of claim 1, further comprising the steps of:
receiving from a program an explicit request to perform diagnostic operations during the next iteration of the booting process; and in response to the receiving step, updating in persistent storage the second flag to the first state.

3. The method of claim 1 wherein the first and second indications are stored persistently in a medium other than CMOS RAM.

4. A computer-readable medium whose contents cause a computer system to boot by performing the steps of:

in conjunction with the beginning of the booting process:
reading from persistent storage a first indication of whether a previous iteration of the booting process terminated prematurely and a second indication of whether the performance of diagnostic operations has been expressly requested;

generating a third indication of whether diagnostic operations should be performed during the booting process based upon the conditions indicated by the first and second indications as read from persistent storage, the third indication indicating that diagnostic operations should be performed if the first indication indicates that the previous iteration of the booting process terminated prematurely or if the second indication indicates that the performance of diagnostic operations has been expressly requested, the third indication indicating that diagnostic operations should not be performed if the first indication indicates that the previous iteration of the booting process did not terminate prematurely and if the second indication indicates that the performance of diagnostic operations has not been expressly requested;

after the generating step:

updating the first indication to indicate that the previous iteration of the booting process terminated prematurely;

updating the second indication to indicate that the performance of diagnostic operations has not been expressly requested;

for each of one or more diagnostic operations,
performing the diagnostic operation if and only if the third indication indicates that diagnostic operations should be performed; and in conjunction with the end of the booting process:
updating the first indication to indicate that the previous iteration of the booting process did not terminate prematurely.

5. The computer-readable medium of claim 4 wherein the contents of the computer-readable medium further cause the computer system to perform the steps of:

receiving from a program an explicit request to perform diagnostic operations during the next iteration of the booting process; and in response to the receiving step, updating in persistent storage the second indication to indicate that the performance of diagnostic operations has not been expressly requested.

6. The computer-readable medium of claim 4 wherein the first, second, and third indications are flags.

7. A method in a computer system for performing selected operations as part of a booting process of the computer system only during iterations of the booting process that immediately follow failed iterations of the booting process, the method comprising the steps of:

copying a persistent instance of a flag indicating whether the iteration of the booting process that the current iteration of the booting process immediately follows failed to a temporary instance of the flag;

after the copying step, setting the persistent instance of the flag;

for each selected operation encountered during the booting process, performing the selected operation only if the temporary instance of the flag is set;

at the conclusion of the current iteration of the booting process, clearing the persistent instance of the flag;

determining that the previous iteration of the booting process failed based upon a determination that the temporary instance of the flag is set; and in response to the determining step, transmitting a failure report to a product support service.

8. A method in a computer system for performing selected optional operations during a current iteration of a booting process of the computer system only where such performance was requested since the completion of the previous iteration of the booting process, the method comprising the steps of:

initially clearing a flag indicating whether performance of the selected optional operations was requested since the completion of the previous iteration of the booting process;

if a request to perform selected optional operations is received between the completion of the previous iteration of the booting process and the beginning of the current iteration of the booting process setting the flag; and for each selected operation encountered during the booting process, performing the selected operation only if the flag is set, wherein a BIOS and an operating system are installed on the computer system, and wherein the setting step is initiated under the control of either the BIOS or the operating system, and wherein selected optional operations are performed by both the BIOS and the operating system when the flag is set, and wherein the performance of selected optional operations are skipped by both the BIOS and the operating system when the flag is not set.

9. A computer-readable medium whose contents cause a computer system to performing selected optional operations during a current iteration of a booting process of the computer system only where such performance was requested since the completion of the previous iteration of the booting process by:

initially clearing a flag indicating whether performance of the selected optional operations was requested since the completion of the previous iteration of the booting process;

if a request to perform selected optional operations is received between the completion of the previous iteration of the booting process and the beginning of the current iteration of the booting process, setting the flag;

for each selected operation encountered during the booting process, performing the selected operation only if the flag is set, wherein a BIOS and an operating system are installed on the computer system, and wherein the setting step is initiated under the control of either the BIOS or the operating system, and wherein selected optional operations are performed by both the BIOS and the operating system when the flag is set, and wherein the performance of selected optional operations are skipped by both the BIOS and the operating system when the flag is not set.

10. A computer memory containing a diagnostic state data structure for maintaining a state reflecting the necessity of performing selected diagnostic operations in a computer system, the computer system having a booting process, iterations of which may either be complete successfully or fail to complete successfully, the data structure comprising:

a first indicator indicating whether the last attempted iteration of the booting process failed to complete successfully; and a second indicator indicating whether the performance of the selected diagnostic operations has been explicitly requested, such that, if either the first indicator indicates that the last attempted iteration of the booting process failed to complete successfully or the second indicator indicates that the performance of the selected diagnostic operations has been explicitly requested, the selected diagnostic operations may be performed, and such that, if the first indicator indicates that the last attempted iteration of the booting process completed successfully and the second indicator indicates that the performance of the selected diagnostic operations has not been explicitly requested, performance of the selected diagnostic operations may be omitted.

11. A method in a computer system for booting a computer system, the method comprising the steps of:

in conjunction with the beginning of the booting process:
reading from persistent storage a first flag and a second flag, the first flag having either a first state indicating that a previous iteration of the booting process terminated prematurely or a second state indicating that the previous iteration of the booting process did not terminate prematurely, the second flag having either a first state indicating that the performance of diagnostic operations has been expressly requested or a second state indicating that the performance of diagnostic operations has not been expressly requested;
copying the first flag to a third flag;
copying the second flag to a fourth flag;
after the copying steps:
updating in persistent storage the first flag to the first state;
updating in persistent storage the second flag to the second state;
for each of one or more of a first type of diagnostic operations,
performing the diagnostic operation if and only if the third flag has the first state;
for each of one or more of a second type of diagnostic operations,
performing the diagnostic operation if and only if the fourth flag has the first state; and
in conjunction with the end of the booting process:
updating in persistent storage the first flag to the second state.

12. A computer-readable medium whose contents cause a computer system to boot by performing the steps of:

in conjunction with the beginning of the booting process:
reading from persistent storage a first indication of whether a previous iteration of the booting process terminated prematurely and a second indication of whether the performance of diagnostic operations has been expressly requested;
copying the first indication to a third indication;
copying the second indication to a fourth indication;
after the generating step:
updating the first indication to indicate that the previous iteration of the booting process terminated prematurely;
updating the second indication to indicate that the performance of diagnostic operations has not been expressly requested;
for each of one or more diagnostic operations of a first type,
performing the diagnostic operation if and only if the third indication indicates that a previous iteration of the booting process terminated prematurely; and
for each of one or more diagnostic operations of a second type,
performing the diagnostic operation if and only if the fourth indication indicates that the performance of diagnostic operations has been expressly requested; and
in conjunction with the end of the booting process:
updating the first indication to indicate that the previous iteration of the booting process did not terminate prematurely.

13. A computer-readable medium whose contents cause a computer system to perform selected operations as part of a booting process of the computer system only during iterations of the booting process that immediately follow failed iterations of the booting process by:

copying a persistent instance of a flag indicating whether the iteration of the booting process that the current iteration of the booting process immediately follows failed to a temporary instance of the flag;
after the copying step, setting the persistent instance of the flag;
for each selected operation encountered during the booting process, performing the selected operation only if the temporary instance of the flag is set;
at the conclusion of the current iteration of the booting process, clearing the persistent instance of the flag;
determining that the previous iteration of the booting process failed based upon a determination that the temporary instance of the flag is set; and
in response to the determining step, transmitting a failure report to a product support service.

14. A generated data signal conveying a diagnostic state data structure for maintaining a state reflecting the necessity of performing selected diagnostic operations in a computer system, the computer system having a booting process, iterations of which may either be complete successfully or fail to complete successfully, the data structure comprising:

a first indicator indicating whether the last attempted iteration of the booting process failed to complete successfully; and
a second indicator indicating whether the performance of the selected diagnostic operations has been explicitly requested, such that, if either the first indicator indicates that the last attempted iteration of the booting process failed to complete successfully or the second indicator indicates that the performance of the selected diagnostic operations has been explicitly requested, the selected diagnostic operations may be performed, and such that, if the first indicator indicates that the last attempted iteration of the booting process completed successfully and the second indicator indicates that the performance of the selected diagnostic operations has not been explicitly requested, performance of the selected diagnostic operations may be omitted.

15. A method in a computer system for performing selected optional operations during a current iteration of a booting process of the computer system only where such performance was requested since the completion of the previous iteration of the booting process, the method comprising the steps of:

initially clearing a flag indicating whether performance of the selected optional operations was requested since the completion of the previous iteration of the booting process;
if a request to perform selected optional operations is received between the completion of the previous iteration of the booting process and the beginning of the current iteration of the booting process, setting the flag; and for each selected operation encountered during the booting process, performing the selected operation only if the flag is set;

wherein the setting step is initiated in a manner selected from the group consisting of under the control of an application program installed on the computer system, under the control of a utility program installed on the computer system, as part of original configuration of the computer system at a time before the first iteration of the booting process occurs, in conjunction with the installation of a new hardware device, in conjunction with the installation of additional software, after a predetermined number of successfully completed iterations of the booting process, and after a predetermined period of time has elapsed.

16. A computer-readable medium whose contents cause a computer system to performing selected optional operations during a current iteration of a booting process of the computer system only where such performance was requested since the completion of the previous iteration of the booting process by:

initially clearing a flag indicating whether performance of the selected optional operations was requested since the completion of the previous iteration of the booting process;

if a request to perform selected optional operations is received between the completion of the previous iteration of the booting process and the beginning of the current iteration of the booting process, setting the flag; and for each selected operation encountered during the booting process, performing the selected operation only if the flag is set;

wherein the setting step is initiated in a manner selected from the group consisting of under the control of an application program installed on the computer system, under the control of a utility program installed on the computer system, as part of original configuration of the computer system at a time before the first iteration of the booting process occurs, in conjunction with the installation of a new hardware device, in conjunction with the installation of additional software, after a predetermined number of successfully completed iterations of the booting process, and after a predetermined period of time has elapsed.

* * * * *

UNITED STATES PATENT AND TRADEMARK OFFICE
CERTIFICATE OF CORRECTION

PATENT NO. : 6,014,744
DATED : January 11, 2000
INVENTOR(S) : Robert M. McKaughan; Forrest Foltz It is certified that errors appear in the above-identified patent and that said Letters Patent is hereby corrected as shown below:

ON THE TITLE PAGE:

In [56] REFERENCES CITED, U.S. Patent Documents, the following document should be added:

--5,627,964    5/1997    Reynolds et al.    395/183--

In Column 3, line 61: "Wile" should read --While--

In Column 4, line 34: "steps 301-303 are" should read --step 301 is--

In Claim 12, Column 9, line 53: "generating step" should read --copying steps--

Signed and Sealed this

Twentieth Day of March, 2001

*Attest:*

NICHOLAS P. GODICI

*Attesting Officer*   *Acting Director of the United States Patent and Trademark Office*